July 7, 1970 K. L. GILLE 3,519,303
SELF-EQUALIZING MULTIPLE POINT LIFTING SYSTEM
Filed April 5, 1968 3 Sheets-Sheet 1

INVENTOR.
KENNETH L. GILLE
BY
Allen and Chromy
ATTORNEYS

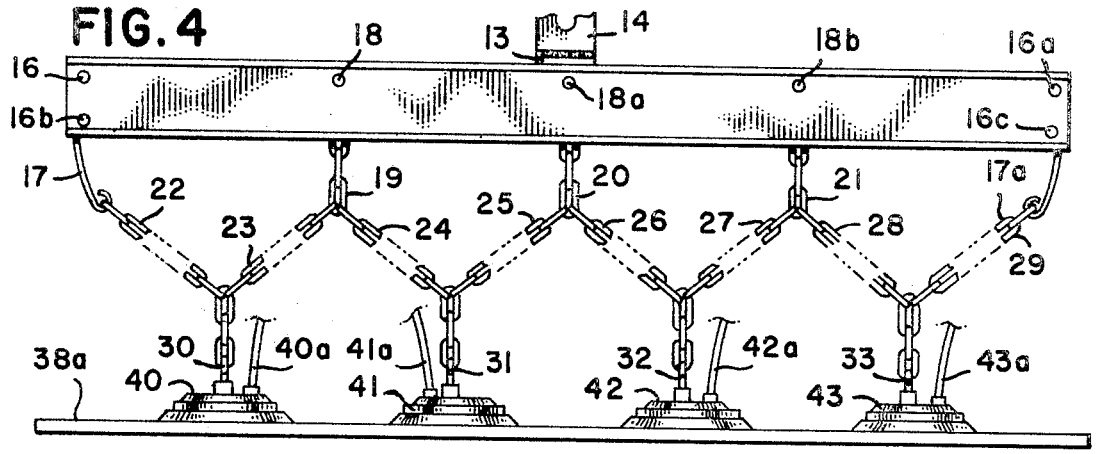
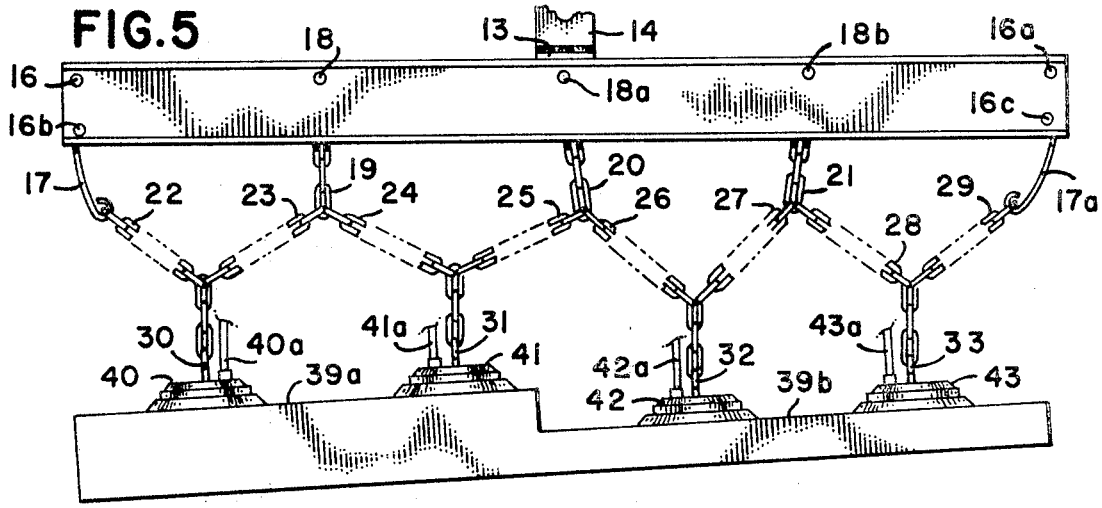
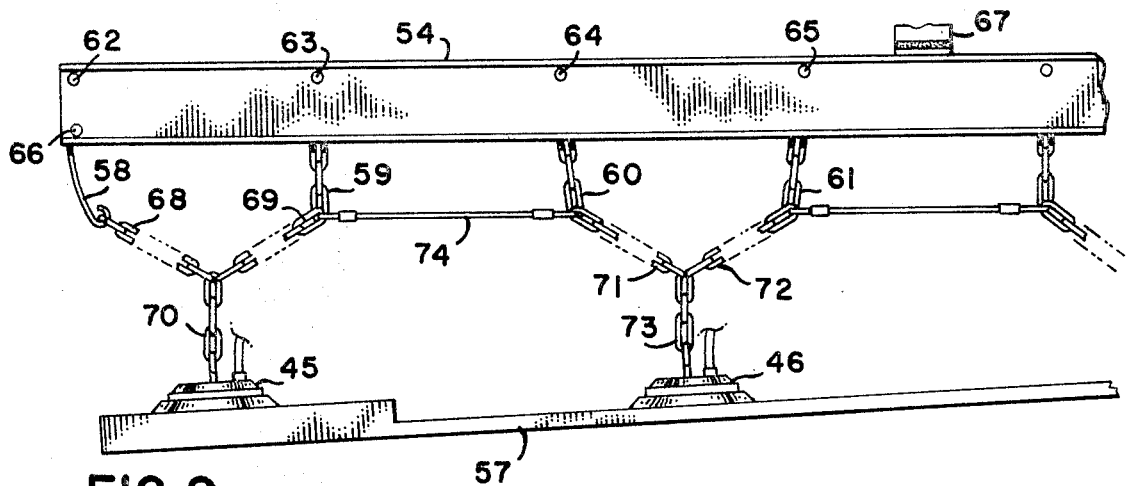

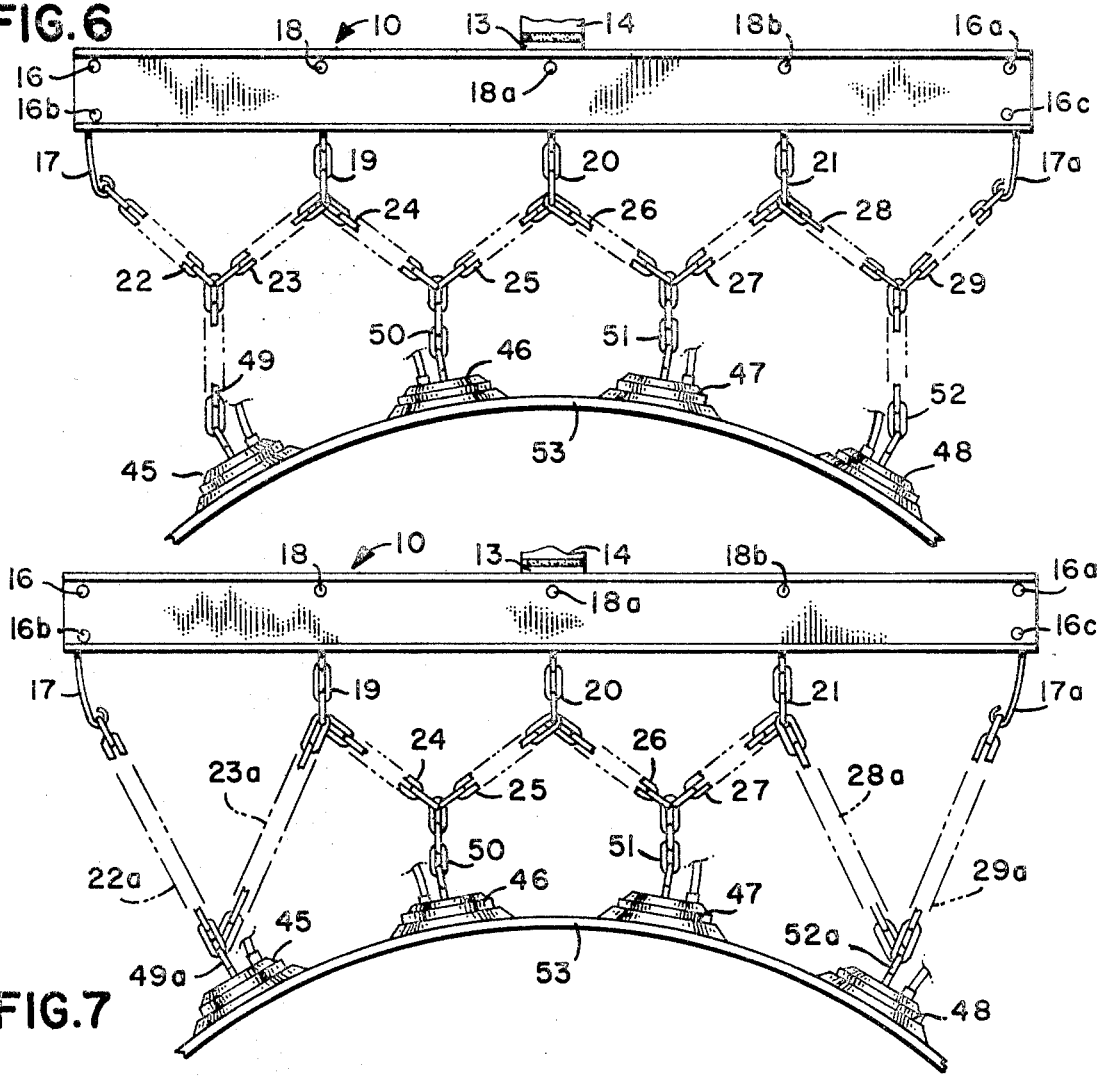
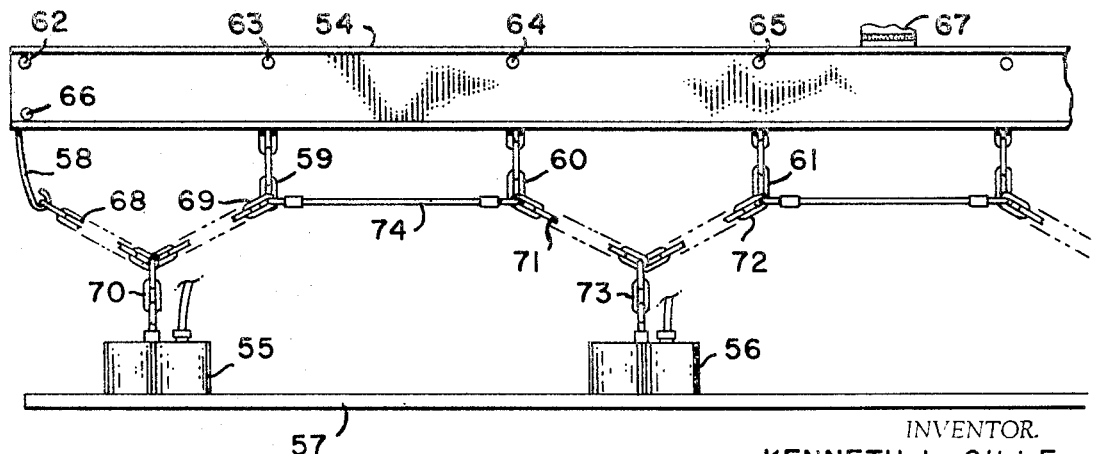

United States Patent Office 3,519,303
Patented July 7, 1970

3,519,303
SELF-EQUALIZING MULTIPLE POINT
LIFTING SYSTEM
Kenneth L. Gille, Los Angeles, Calif., assignor to Buck Manufacturing Company, Los Angeles, Calif., a corporation of Delaware
Filed Apr. 5, 1968, Ser. No. 719,086
Int. Cl. B66c 1/00
U.S. Cl. 294—81                                         9 Claims

ABSTRACT OF THE DISCLOSURE

A load lifting and supporting apparatus employing a strong back provided with a plurality of load gripping devices which may be magnetic or vacuum and which are supported therefrom by a system of interconnected individual members, the angular relationships of which, with respect to each other, depend upon the attitude or condition of the load gripped by the devices. Also, if one of the gripping devices fails, the total load is then distributed over all of the remaining gripping devices attached to the strong back and not just to the two adjacent devices. The system of supporting the load gripping devices from the strong back is effective in assuring uniform distribution of the load among the several load gripping devices as is necessary on fragile solids such as glass-lined cylinders in which unequal support by different gripping devices would cause damage. This system of supporting load gripping devices is also adapted to support sheets of flexible material as well as loads of irregular configuration.

DESCRIPTION OF THE INVENTION

This invention relates to a load lifting and supporting apparatus employing a strong back and a system of interconnected members connecting a plurality of load gripping devices thereto.

An object of this invention is to provide an improved load lifting and supporting apparatus employing a strong back and a plurality of load gripping devices attached thereto such that the load is distributed among the devices.

Another object of this invention is to provide an improved load lifting and supporting apparatus employing a strong back and a plurality of load gripping devices such as magnets or vacuum grips which are supported from the strong back by a system of individual interconnected suspension members which are always in tension and which may be in the form of chains or solid members, said suspension system being arranged so that there is a tendency to substantially uniformly distribute the load among the individual gripping devices and the suspension of the individual gripping devices is sufficiently flexible so that loads of irregular configuration and also loads which cannot tolerate flexing may be supported by the apparatus.

Other and further objects of this invention will be apparent to those skilled in the art to which it relates from the following specification, claims and drawing, in which, briefly;

FIG. 4 is a view of the strong back and vacuum gripping devices supported therefrom by a suspension system of this invention, said gripping devices being attached to the load by vacuum;

FIG. 5 is a view showing the strong back and gripping system shown in FIG. 4 supporting an irregular load;

FIG. 6 is a view showing one of the devices of this invention provided with four load gripping devices supporting a curved member which may be a section of one end of a pipe;

FIG. 7 is a view similar to FIG. 6 with a modified suspension system;

FIG. 8 is a partial view of a modified embodiment of this invention employing two load gripping devices having selected supporting members thereof connected by an auxiliary member; and FIG. 9 is a partial view similar to FIG. 7 employing the gripping devices for lifting an irregular load.

Figure 1:
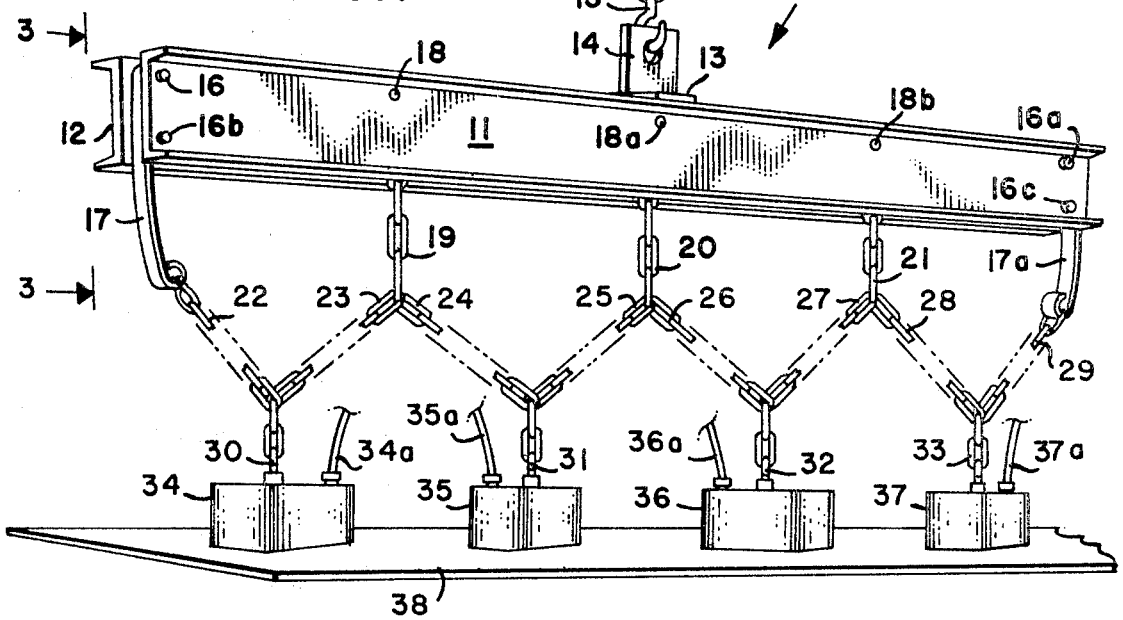
FIG. 1 is a perspective view showing the strong back and magnetic gripping devices supported therefrom by a suspension system of this invention supporting a sheet of magnetic flexible material.

Referring to the drawing in detail, reference numeral 10 designates a strong back made of channel members 11 and 12 which are positioned in parallel spaced relation and which are bridged by a plate 13 welded or otherwise attached to the central upper parts thereof. The strong back 10 may be made of one or more elongated rigid members other than the channel members 11 and 12 illustrated in the drawing, or it may be made in the form of a frame of spaced members so that the frame is of more or less rectangular shape, if desired.

A vertical member 14 is attached to the plate 13 by welding or the like and this member is provided with a hole for receiving the supporting hook 15 which may be attached to a suitable hoist (not shown). Vertically disposed resilient members 17 and 17a are attached to the strong back by the pivot bolts 16 and 16a, respectively, at the respective ends of the strong back. The resilient members 17 are adapted to swing about the pivots 16 and 16a, respectively, and the inward motions of these members are limited by the bolts 16b and 16c, respectively, when a load is applied thereto, as will be described more fully hereinafter.

Additional bolts 18, 18a and 18b are provided to the strong back at intermediate points thereof and the upper ends of the chains 19, 20 and 21, respectively, are attached thereto. Rigid members pivotally supported by the bolts 18, 18a and 18b may be substituted for the chains 19, 20, and 21. Normally the chains 19, 20 and 21 extend downward so that the lowest link thereof is at about the same level as the loops in the bottom parts of resilient members 17 and 17a.

Figure 2:
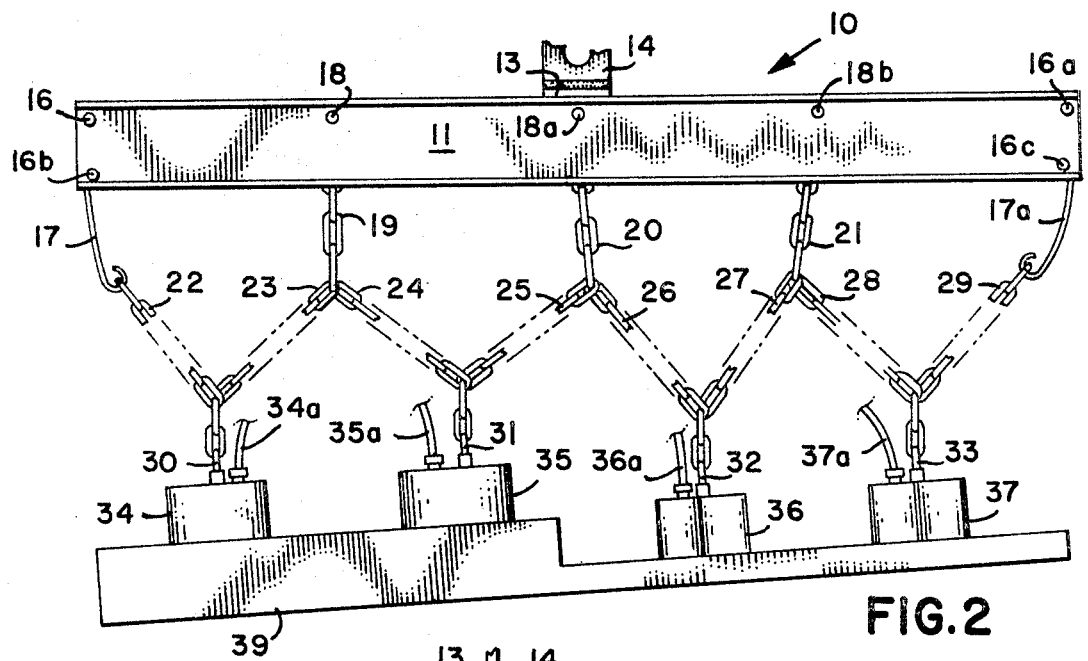
FIG. 2 is a side view showing the strong back and magnetic load gripping apparatus of this invention supporting a load of magnetic material that is irregular.
Figure 3:
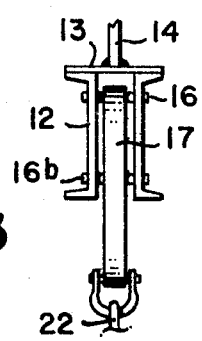
FIG. 3 is a detail view taken along the line 3—3 of FIG. 1.

The resilient end members 17 and 17a, together with the chains 19, 20 and 21 are employed in combination with a plurality of interlinking chain lengths 22 to 29, inclusive, and short vertical chain lengths 30 to 33, inclusive, for supporting the electromagnets 34 to 37, inclusive, respectively, in such a way that the magnets may be employed for raising a sheet of magnetic material 38 of substantially flat or plane surface, or a member 39, shown in FIG. 2, which has an irregular surface. Comparison of the angular dispositions of the supporting linkages of the load gripping devices as shown in FIGS. 1 and 2 illustrates an important feature of this invention, namely, that the supporting linkages tend to distribute the load among the gripping devices.

The magnets 34 to 37 inclusive are of conventional construction and each of them is provided with a suitable winding for magnetizing the core thereof when a suitable electric current is supplied thereto. For this purpose a source of current supply is connected to the cables 34a to 37a, inclusive, for energizing these magnets.

When a flat body such as the sheet 38 is to be gripped by the magnets 34 to 37, inclusive, the magnets are all disposed at substantially the same horizontal level and the angles between the chain pairs 22–23, 24–25, 26–27 and 28–29 are all substantially the same. On the other hand, when an irregular member such as the member 39 is gripped and supported by the electromagnets 34 to 37, inclusive, the normally vertical chain lengths 19, 20 and 21 will be inclined somewhat from the vertical, as shown in FIG. 2, and the angles between the chain pairs 22–23 and 24–25 will be somewhat different from the angles between the chain pairs 26–27 and 28–29. Thus, the chain linkages supporting the electromagnets provide sufficient flexibility in supporting the magnets to permit them to grip an irregular object in which the upper surface departs materially from a flat surface or in which the weight is not uniformly distributed. Also, since the chains 22 to 33, inclusive, are always under tension when supporting a load, rigid members of corresponding lengths may be substituted therefor, if desired.

The angles assumed by the outer chain lengths 22 and 29 when the magnets 34–37 are gripping a load is determined to a certain extent by the resilience of the members 17 and 17a, and also by the position of the pins 16b and 16c which are supported by the strong back. The inward flexing of the resilient members 17 and 17a is also determined by the shape and weight of the object lifted by the magnets, as well as the positions of the pins 16b and 16c, respectively.

This strong back and chain arrangement may also be used in conjunction with vacuum gripping devices, as shown in FIGS. 4 and 5. In these figures the vacuum gripping devices are designated by reference numerals 40, 41, 42 and 43. These vacuum gripping devices are of conventional construction and they are provided with suitable hose connections 40a, 41a, 42a and 43a, respectively, which are connected to a suitable suction or vacuum producing apparatus (not shown) which is also of conventional construction. The strong back and chain or rigid member system provided for supporting the vacuum gripping devices 40, 41, 42 and 43, shown in FIGS. 4 and 5, are designated by the same reference numerals as are used to designate corresponding parts in FIGS. 1 and 2 since the functions of these parts are the same in both the magnetic and vacuum gripping apparatus.

In practice, the apparatus shown in FIGS. 1 and 2 which employs the electromagnets 34–37 is employed for raising sheets 38 and irregular members 39, which are either wholly or partially made of magnetic material. On the other hand, the vacuum gripping devices 40–43, shown in FIGS. 4 and 5, may be employed for raising sheets and irregular members 38a and 39a, respectively, of either magnetic or nonmagnetic material, as long as a suitable vacuum grip may be applied thereto. Thus, the vacuum gripping devices may be employed for raising members of metal, glass, plastic, wood or the like.

In FIGS. 6 and 7 there are shown multiple point lifting systems employing the load gripping devices 45, 46, 47 and 48 which may be either of the magnetic or vacuum type for lifting one end of a round member or a section of a round member 53, which may be a glass-lined cylinder. In these systems a similar arrangement of gripping devices may be used for lifting the other end of the member 53, and if the member 53 is relatively long, then an additional set of gripping devices may be attached to the center thereof. The end gripping devices 45 and 48 are provided with longer supporting linkages than the intermediate load gripping devices 46 and 47. Thus, in the system shown in FIG. 6, the supporting linkages 22 to 29, inclusive, are all substantially the same length, whereas, the vertical supporting means 49 and 52 of gripping devices 45 and 48, respectively, are longer than the vertical supporting means 50 and 51 of gripping devices 46 and 47, respectively. On the other hand, in the system shown in FIG. 7, the supporting linkages 22a and 23a of load gripping device 45 are longer than the supporting linkages 24 and 25, respectively, of load gripping device 46. The supporting linkages 22a–23a and 28a–29a are long enough so that the load gripping devices 45 and 48 may be positioned on the side of the curved member 53. The supports 28a and 29a of load gripping device 48 may be of the same or different lengths as the supports 22a and 23, respectively, of load gripping device 45, depending on the shape or location thereof on the side of the curved member 53. The lower ends of supporting linkages 22a–23a are attached by links 49a to load gripping device 45 and the lower ends of supporting linkages 28a–29a are attached by links 52a to load gripping device 48. The supports 22a, 23a, 28a and 29a may be either chain linkages or rigid members of corresponding lengths. The upper ends of the supports 22a and 23a are attached to the resilient members 17 and 19, respectively. Likewise, the supports 28a and 29a are attached to the chain 21 and resilient member 17a, respectively. The supports 24, 25, 26, and 27 for the load gripping devices 46 and 47 are of the same length. The device 46 is attached by the links 50 to the bottom ends of the supports 24 and 25 and the device 47 is attached by the links 51 to the bottom ends of the supports 26 and 27.

In the examples of this invention shown in FIGS. 8 and 9 there is illustrated in each case a part of a multiple point lifting system in which the flexible supporting means of adjacent gripping devices are interconnected by rigid members. Two load gripping devices 55 and 56 are shown for supporting a part of the load 57. The strong back 54 is made of two relatively long members such as the members 11 and 12 previously described. Gripping devices supporting members 58, 59, 60 and 61 are attached to the strong back by suitable pins 62, 63, 64 and 65, respectively. Member 58 is shown as a resilient solid member, whereas, members 59, 60 and 61 are shown as chains. If desired, members 59, 60 and 61 may also be elongated solid members. A suitable pin 66 is provided to the end part of the strong back 54 to limit the inward movement of vertical member 58. A similar arrangement (not shown) is provided at the other end of the strong back 54 which is only partially illustrated in FIGS. 8 and 9 since the other part thereof including the gripping devices and supporting means is the same as the part shown.

Load gripping device 55 is supported from the bottom ends of the members 58 and 59 by the angularly disposed linkages 68 and 69, and the linkage 70 and load gripping device 56 is supported from the bottom ends of the members 71 and 72 by the linkage 73. Since only a part of the strong back 54 and gripping device system is shown in FIGS. 8 and 9, it is understood that the part not illustrated is the same as that shown so that the system is substantially symmetrical with respect to the member 67 to which the lifting mechanism such as a hoist may be attached.

An equalizing member 74, which may be either a rigid member or a chain, is provided between the suspension arrangements of the load gripping devices 55 and 56. Thus, one end of the member 74 is connected to the supporting members 59 and 69, and the other end of member 74 is connected to members 60 and 71. Load gripping device 55 may be positioned on a part of the load 57, which is either heavier or lighter than the other part of the load to which gripping device 56 is attached, and a pulling force is applied by member 74 from the supporting members of one of these gripping devices to the supporting members of the other of these gripping devices, thereby tending to equalize the load or proportion the load between these devices so that the tendency of any one gripping device assuming too much of the load and losing its grip is minimized.

The load lifting systems shown in FIGS. 6, 7, 8 and 9 are adapted for use with either the magnetic or the vacuum type gripping devices for lifting loads of different types.

If desired, the strong back or beams 10 and 54 may be provided with suspension members 14 and 67 respectively which may be positioned at different points on the beam in order to place the hook of the hoist above the center of gravity of the load. On the other hand, several members 14 and 67 may be provided at spaced points on the tops of the beams 10 and 54, respectively, and the hoist hook attached to the member positioned over or approximately over the center of gravity of the load. Such an arrangement may be desirable in handling certain loads where such loads are to be carried in a substantially level position.

What I claim is:

1. In a self-equalizing multiple point lifting system adapted to support a plurality of load gripping devices for lifting and supporting loads which may comprise flat, round or irregular objects gripped by said devices, the combination of a strong back, means supporting said strong back so that it is substantially horizontal, a plurality of load gripping devices, means supporting said gripping devices from said strong back so that they hang therefrom in a predetermined pattern, said last mentioned supporting means including a plurality of substantially vertical members, selected ones of said substantially vertical members each supporting at least two inclined members, said last mentioned supporting means also including means connecting each of said gripping devices to the bottom parts of at least two of said inclined members which are supported by different ones of said substantially vertical members, the angles of inclination of said inclined members varying with the shape of the load so that each of said gripping devices grips the load effectively and assumes a predetermined proportion of the load.

2. In a self-equalizing multiple point lifting system adapted to support a plurality of load gripping devices for lifting and supporting loads which may comprise flat, round or irregular objects gripped by said devices, the combination as set forth in claim 1, further characterized in that the upper ends of said substantially vertical members are pivotally attached to spaced points of said strong back.

3. In a self-equalizing multiple point lifting system adapted to support a plurality of load gripping devices for lifting and supporting loads which may comprise flat, round or irregular objects gripped by said devices, the combination as set forth in claim 1 further characterized in that said selected ones of said inclined members are arranged in pairs, different ones of said pairs being attached to different ones of said gripping devices.

4. In a self-equalizing multiple point lifting system adapted to support a plurality of load gripping devices for lifting and supporting loads which may comprise flat, round or irregular objects gripped by said devices, the combination as set forth in claim 3 further characterized in that the lower ends of predetermined ones of said substantially vertical members are attached to one of said inclined members from each of two of said pairs.

5. In a self-equalizing multiple point lifting system adapted to support a plurality of load gripping devices for lifting and supporting loads which may comprise flat, round or irregular objects gripped by said devices, the combination as set forth in claim 4 further characterized in that said substantially vertical members are pivotally connected to said strong back at spaced points and two of said substantially vertical members other than said predetermined ones thereof being connected to said strong back adjacent the ends thereof.

6. In a self-equalizing multiple point lifting system adapted to support a plurality of load gripping devices for lifting and supporting loads which may comprise flat, round or irregular objects gripped by said devices, the combination as set forth in claim 5 further characterized in that means is provided to said strong back to limit the inward pivotal movement of said two of said substantially vertical members.

7. In a self-equalizing multiple point lifting system adapted to support a plurality of load gripping devices for lifting and supporting loads which may comprise flat, round or irregular objects gripped by said devices, the combination as set forth in claim 6 further characterized in that said two of said substantially vertical members flexing inwardly a predetermined extent under a predetermined load.

8. In a self-equalizing multiple point lifting system adapted to support a plurality of load gripping devices for lifting and supporting loads which may comprise flat, round or irregular objects gripped by said devices, the combination as set forth in claim 1 further characterized in that the upper ends of said substantially vertical members are pivotally attached to spaced points of said strong back, and means connecting the lower parts of selected ones of said substantially vertical members, said last mentioned means being normally under tension.

9. In a self-equalizing multiple point lifting system adapted to support a plurality of load gripping devices for lifting and supporting loads which may comprise flat, round or irregular objects gripped by said devices, the combination as set forth in claim 1 further characterized in that said selected ones of said inclined members are arranged in pairs, different ones of said pairs being attached to different ones of said gripping devices, and means normally under tension connecting adjacent ones of said pairs.

References Cited

UNITED STATES PATENTS 2,780,487    2/1957    Bredensteiner et al. ____ 294—81

FOREIGN PATENTS 1,207,580    12/1965    Germany.

EVON C. BLUNK, Primary Examiner

R. S. GAITHER, Assistant Examiner